United States Patent
Langeslag et al.

(10) Patent No.: US 11,626,794 B2
(45) Date of Patent: Apr. 11, 2023

(54) FREQUENCY COMPENSATION GAIN LOSS FOR A POWER CONVERTER SUPPORTING CCM, BCM, AND DCM

(71) Applicant: NXP USA, Inc., Austin, TX (US)

(72) Inventors: Wilhelmus Hinderikus Maria Langeslag, Wijchen (NL); Remco Twelkemeijer, Wijchen (NL)

(73) Assignee: NXP USA, Inc., Austin, TX (US)

( * ) Notice: Subject to any disclaimer, the term of this patent is extended or adjusted under 35 U.S.C. 154(b) by 131 days.

(21) Appl. No.: 17/204,603

(22) Filed: Mar. 17, 2021

(65) Prior Publication Data

US 2022/0302819 A1 Sep. 22, 2022

(51) Int. Cl.
*H02M 3/156* (2006.01)
*H02M 1/42* (2007.01)

(52) U.S. Cl.
CPC ........... *H02M 1/4225* (2013.01); *H02M 1/42* (2013.01); *H02M 3/156* (2013.01)

(58) Field of Classification Search
CPC .... H02M 1/4225; H02M 1/42; H02M 1/0022; H02M 1/0025; H02M 1/0032; H02M 3/158; H02M 3/156; Y02B 70/10
See application file for complete search history.

(56) References Cited

U.S. PATENT DOCUMENTS

| | | | |
|---|---|---|---|
| 7,652,604 B2 | 1/2010 | Parayandeh et al. | |
| 8,599,579 B2 | 12/2013 | Kuebrich et al. | |
| 9,531,284 B2 * | 12/2016 | Wahby | H02M 3/156 |
| 9,887,624 B2 * | 2/2018 | Hofmann | H02M 3/156 |
| 10,734,887 B1 * | 8/2020 | Halberstadt | H02M 1/4225 |
| 10,734,888 B1 * | 8/2020 | Halberstadt | H02M 1/4225 |
| 2020/0220452 A1 * | 7/2020 | Lim | H02M 1/4208 |
| 2022/0294332 A1 | 9/2022 | Langeslag et al. | |

FOREIGN PATENT DOCUMENTS

CN 106787668 A 5/2017

OTHER PUBLICATIONS

Fu-Zen Chen et al., "Digital Control for Improved Efficiency and Reduced Harmonic Distortion Over Wide Load Range in Boost PFC Rectifiers." Copyrighted 2009; IEEE Xplore; 7 pgs.
David M. Van De Sype, et al. "Duty-Ratio Feedforward for Digitally Controlled Boost PFC Converters." IEEE Transactions on Industrial Electronics, vol. 52, No. 1, Feb. 2005; 8 pgs.

(Continued)

*Primary Examiner* — Kyle J Moody
*Assistant Examiner* — Jye-June Lee

(57) ABSTRACT

Various embodiments relate to a current loop controller configured to control a boost converter, including: an amplifier configured to scale a measured current; a subtractor configured to subtract the scaled measured current from a desired current and to output an error signal; a controller including an integral part and a proportional part configured to produce a control signal based upon the error signal; a measuring circuit configured to measure the actual switching period of the boost converter; and a switch signal generator configured to produce a switching signal based upon the control signal and the measured actual switching period, wherein the switch signal controls the boost converter.

14 Claims, 7 Drawing Sheets

(56) References Cited

OTHER PUBLICATIONS

Koen De Gussemé et al. "Digitally Controlled Boost Power-Factor-Correction Converters Operating in Both Continuous and Discontinuous Conduction Mode." IEEE Transactions on Industrial Electronics, vol. 52, No. 1, Feb. 2005; 10 pgs.

Manjing Xie, et al. Novel Current-Loop Feed-Forward Compensation for Boost PFC Converter. Copyrighted 2004 IEEE Xplore; 6 pgs.

Ren, Xiaoyong et al.; "An Online Monitoring Method of Circuit Parameters for Variable On-Time Control in CRM Boost PFC Converters"; IEEE Transactions on Power Electronics, Institute of Electrical and Electronics Engineers, USA, vol. 34, No. 2, Feb. 1, 2019; pp. 1786-1797.

* cited by examiner

FREQUENCY COMPENSATION GAIN LOSS FOR A POWER CONVERTER SUPPORTING CCM, BCM, AND DCM

TECHNICAL FIELD

Various exemplary embodiments disclosed herein relate generally to using compensation for a power converter supporting continuous conduction mode (CCM), boundary conduction mode (BCM), and discontinuous conduction mode (DCM).

BACKGROUND

A power factor controller (PFC) controller may be used to control a boost converter. For a PFC controller working in CCM, an average mode control may be used for regulating the current. This method is noise insensitive because the average current is used instead of peak current to control the current, which has the effect of smoothing out any noise.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a current loop controller configured to control a boost converter, including: an amplifier configured to scale a measured current; a subtractor configured to subtract the scaled measured current from a desired current and to output an error signal; a controller including an integral part and a proportional part configured to produce a control signal based upon the error signal; a measuring circuit configured to measure an actual switching period of the boost converter; and a switch signal generator configured to produce a switching signal based upon the control signal and the measured actual switching period, wherein the switch signal controls the boost converter.

Various embodiments are described, further comprising a first clamp circuit configured to clamp the measured actual switching period.

Various embodiments are described, further comprising a low pass filter configured to filter the measured actual switch period.

Various embodiments are described, further including: a divider configured to divide the measured actual switching period by a set time period; a multiplier configured to multiply the set time period and an output of the low pass filter, wherein the low pass filter filters an output of the divider, and wherein the output of the multiplier is input into the switching signal generator.

Various embodiments are described, further including: a first clamp circuit configured to clamp the measured actual switching period; and a second clamp circuit configured to clamp the set time period.

Various embodiments are described, further including: a divider configured to divide the measured actual switching period by a set time period; a multiplier configured to multiply an output of low pass filter with the error signal, wherein the output of the multiplier is input into the controller including the integral part and a proportional part, wherein the low pass filter filters an output of the divider, and wherein the switching signal generator is further configured to generate the switching signal based upon the set time period.

Various embodiments are described, further including: a first clamp circuit configured to clamp the measured actual switching period; and a second clamp circuit configured to clamp the set time period.

Further various embodiments relate to a current loop controller configured to control a boost converter, including: an amplifier configured to scale a measured current; a subtractor configured to subtract the scaled measured current from a desired current and to output an error signal; a controller including an integral part and a proportional part configured to produce a control signal based upon the error signal; a measuring circuit configured to measure an actual switching period of the boost converter; a first clamp circuit configured to clamp the measured actual switching period; and a second clamp circuit configured to clamp a set time period to a clamp value, wherein the first clamp circuit has a same clamp value; a divider configured to divide the clamped measured actual switching period by the clamped set time period; a low pass filter configured to filter an output of the divider; a multiplier configured to multiply an output of low pass filter with the error signal, wherein the output of the multiplier is input into the controller including the integral part and a proportional part; and a switch signal generator configured to produce a switching signal based upon the control signal and the clamped set time period, wherein the switch signal controls the boost converter.

Further various embodiments relate to a method for controlling a current loop controller configured to control a boost converter, including: scaling a measured current; subtracting the scaled measured current from a desired current and outputting an error signal; producing a control signal based upon the error signal using a controller including an integral part and a proportional part; measuring an actual switching period of the boost converter; low pass filtering a value based upon the measured actual switch period to produce a filtered value; and producing a switching signal based upon the control signal and the value, wherein the switch signal controls the boost converter.

Various embodiments are described, further including clamping the measured actual switching period based upon a clamping value.

Various embodiments are described, further including: dividing the measured actual switching period by the set time period to produce a divided value; and multiplying the set time period and filtered to produce a multiplied value, wherein the low pass filtering filters the divided value, and wherein producing a switching signal is further based upon the multiplied value.

Various embodiments are described, further including: clamping a set time period based upon the clamping value.

Various embodiments are described, further including: dividing the measured actual switching period by the set time period to produce a divided value; and multiplying filtered value with the error signal producing a multiplied value, wherein producing a control signal is further based upon the multiplied value, wherein low pass filtering filters the divided value.

Various embodiments are described, further including: clamping a set time period based upon the clamping value.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A power factor controller (PFC) controller may be used to control a boost converter. For a PFC controller working in CCM, an average mode control may be used for regulating the current. This method is noise insensitive because the average current is used instead of peak current to control the current, which has the effect of smoothing out any noise. This method works fine for CCM, but when the system is required to operate outside of CCM (i.e., BCM and DCM) the frequency can drop in BCM, and an additional frequency compensation is needed to keep the bandwidth high. There are also situations where the switching frequency may get too low. In this case, the loop bandwidth should be reduced to keep enough gain and phase margin for stability.

During operation of a boost converter being controlled by a PFC the following conditions may occur: the frequency in DCM may be lower than the set frequency because of valley switching; the frequency may be lower in BCM, because the same system should be capable of running without CCM; when the switching frequency drops close to loop bandwidth of the loop, the loop bandwidth should be reduced to keep enough phase margin for stability; and when the frequency setpoint is too close to the loop bandwidth, the bandwidth is also reduced to keep enough gain and phase margin. Embodiments of a current loop controller are described herein to compensate the loop in these conditions.

Figure 1:
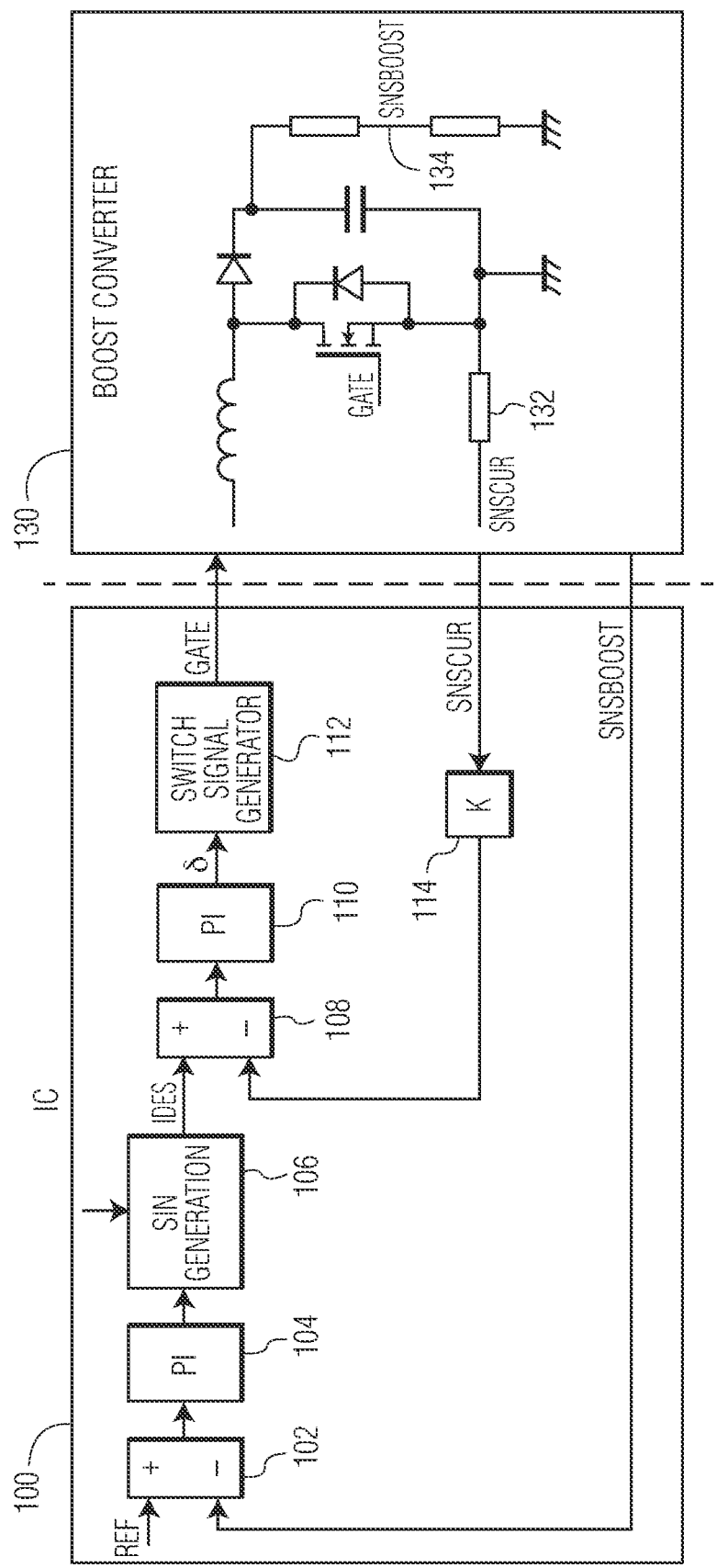
FIG. 1 illustrates a block diagram of a PFC using average current control to control a boost converter.

FIG. 1 illustrates a block diagram of a PFC using average current control to control a boost converter. The boost converter 130 is a typical boost converter that may allow for the measurement of current SNSCUR 132 and the voltage output of the boost converter SNSBOOST 134. The PFC converter includes a first subtractor 102, a first proportional integral (PI) controller 104, a sine wave generator 106, a second subtractor 108, a second PI controller 110, a switch signal generator 112, and a feedback gain amplifier 114. In FIG. 1, the PFC controller 100 includes two feedback loops. The outer loop which ensures that the output voltage SNSBOOST 134 of the boost converter 130 is always a fixed value (e.g., 400V). SNSBOOST 134 is input into the first subtractor where it is subtracted from a reference voltage Ref and the difference (error signal) is input into the first PI controller 104. This then controls the sine wave generator to generate a sine wave based upon the output of the first PI controller 104. The ideal requested current Ides from the sine wave generator 106 is then used in the inner loop to regulate the scaled input current of the PFC to the Ides. In general the Ides has a sine wave shape generated by the sine wave generator 106, which may be generated internally, but may also be derived from the mains voltage. The SNSUR is amplified by amplifier 114 and then subtracted from Ides by the second subtractor 108. The output of the second subtractor 108 is input into a second PI controller 110 which produces a control signal that is input into the switch signal generator 112. The switch signal generator generates the switch control signal that is used to open and close the switch in the boost converter 130.

Figure 2C:
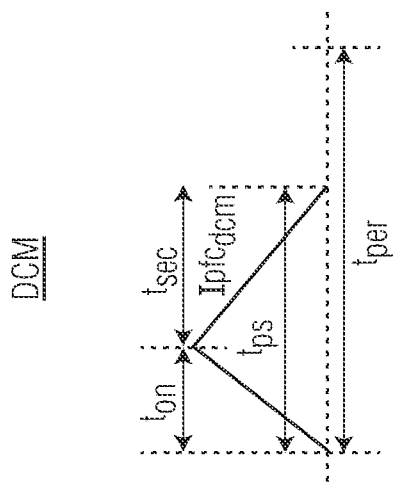
FIGS. 2A, 2B, 2C illustrate the current value and timing for the different control modes: CCM; BCM; and DCM.
Figure 2B:
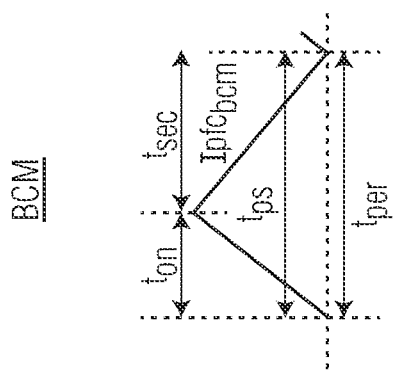
Figure 2A:
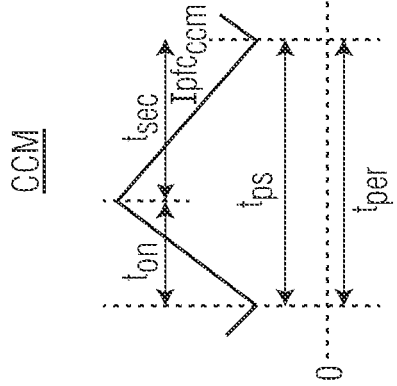

FIGS. 2A, 2B, 2C illustrate the current value and timing for the different control modes of the boost converter 130: continuous conduction mode (CCM); boundary conduction mode (BCM sometimes also called critical conduction mode or quasi resonant mode); and discontinuous conduction mode (DCM). Each input current signal of the boost converter has a period defined by $t_{per}$, which is the time of each period of the switching cycle. The switch is on for $t_{on}$ and the current then decreases for a secondary time $t_{sec}$. The value $t_{ps}$ is the time that the current is nonzero ($=t_{on}+t_{sec}$). In CCM, the current rises during $t_{on}$, then it drops during $t_{sec}$, but the current does not drop to zero, before the switching cycle ends. In BCM, the controller waits until the current is zero and the values of $t_{on}+t_{sec}$ ($t_{ps}$) are equal to $t_{per}$. In DCM, the current drops to zero after the time $t_{sec}$, before the cycle ends.

When CCM is disabled in the PFC, the frequency in BCM has to go down to achieve the needed power level. As a result, the loop gain will drop.

The following values are defined to compensate for the issues that may arise in BCM and DCM. The value $t_{per\_set}$ is the desired period time to drive the boot converter. The value $t_{per\_actual}$ is the real period time of the boost converter, which may be different from the wanted period time because of BCM operation when no CCM is allowed or in DCM operation when valley switching is used.

Figure 3:
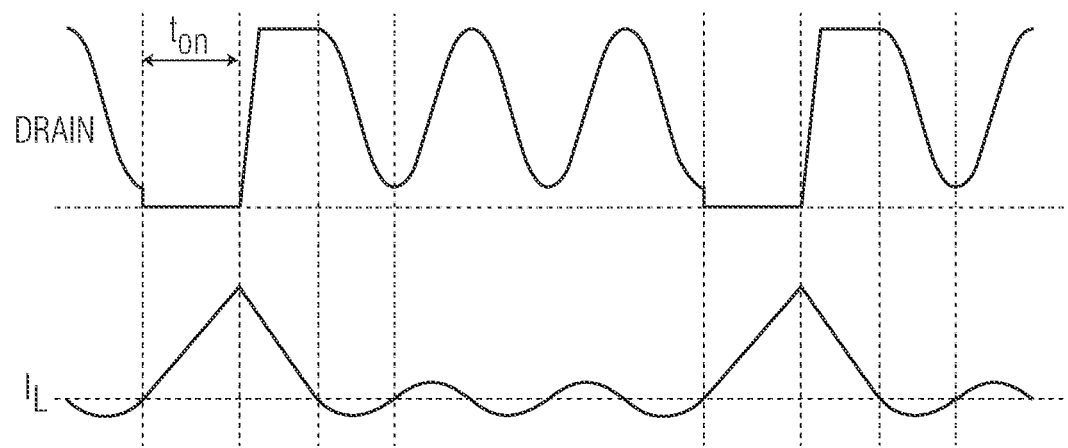
FIG. 3 illustrates a plot of the voltage at the drain of the MOSFET and the current through the inductor of the boost converter.
Figure 4:
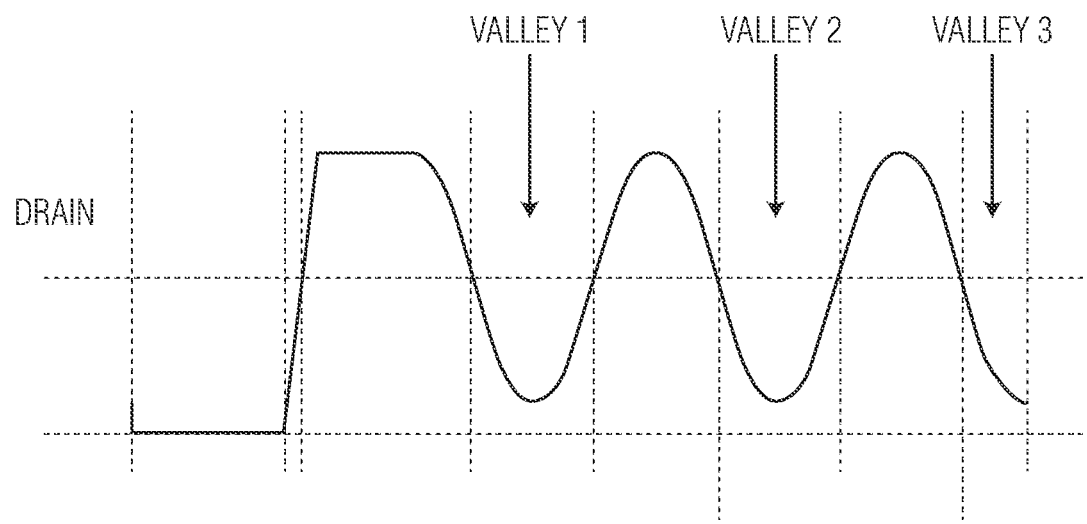
FIG. 4 illustrates a plot of the drain voltage during the ringing phase after switching.

FIG. 3 illustrates a plot of the voltage at the drain of the MOSFET and the current through the inductor of the boost converter. During the on time $t_{on}$, the current $I_L$ builds in the inductor. Then when $t_{on}$ ends, the drain voltage increases and the inductor current $I_L$ starts to drop. When the current $I_L$ reaches zero ringing occurs. This ringing occurs in the drain voltage as well as in the inductor current $I_L$. It is best to switch the transistor in the boost converter when the ringing drain voltage is in a valley (i.e., minimum value) of the ringing. FIG. 4 illustrates a plot of the drain voltage during the ringing phase after switching. FIG. 4 shows three valleys, Valley 1, Valley 2, and Valley 3. The PFC detects one of these valleys and seeks to start the next cycle at that valley. This causes the period $t_{per\_actual}$ to vary. This is especially true if the controller uses a different valley from one period to another. This causes $t_{per\_actual}$ to vary from the desired $t_{per\_set}$.

The transfer function of the boost converter in DCM/BCM is:

$$\frac{d}{dt_{on}} I_{pfc\_DCM} = \frac{V_{in}}{L} \cdot \frac{t_{ps}}{t_{per\_actual}} \cdot \frac{1}{\frac{1}{\omega_{lpf}}s + 1} \quad (1)$$

with:

$$\omega_{lpf} = 2 \cdot \frac{(V_{out} - V_{in})}{t_{on} \cdot V_{in}} = \frac{2}{t_{sec}} \quad (2)$$

Figure 5:
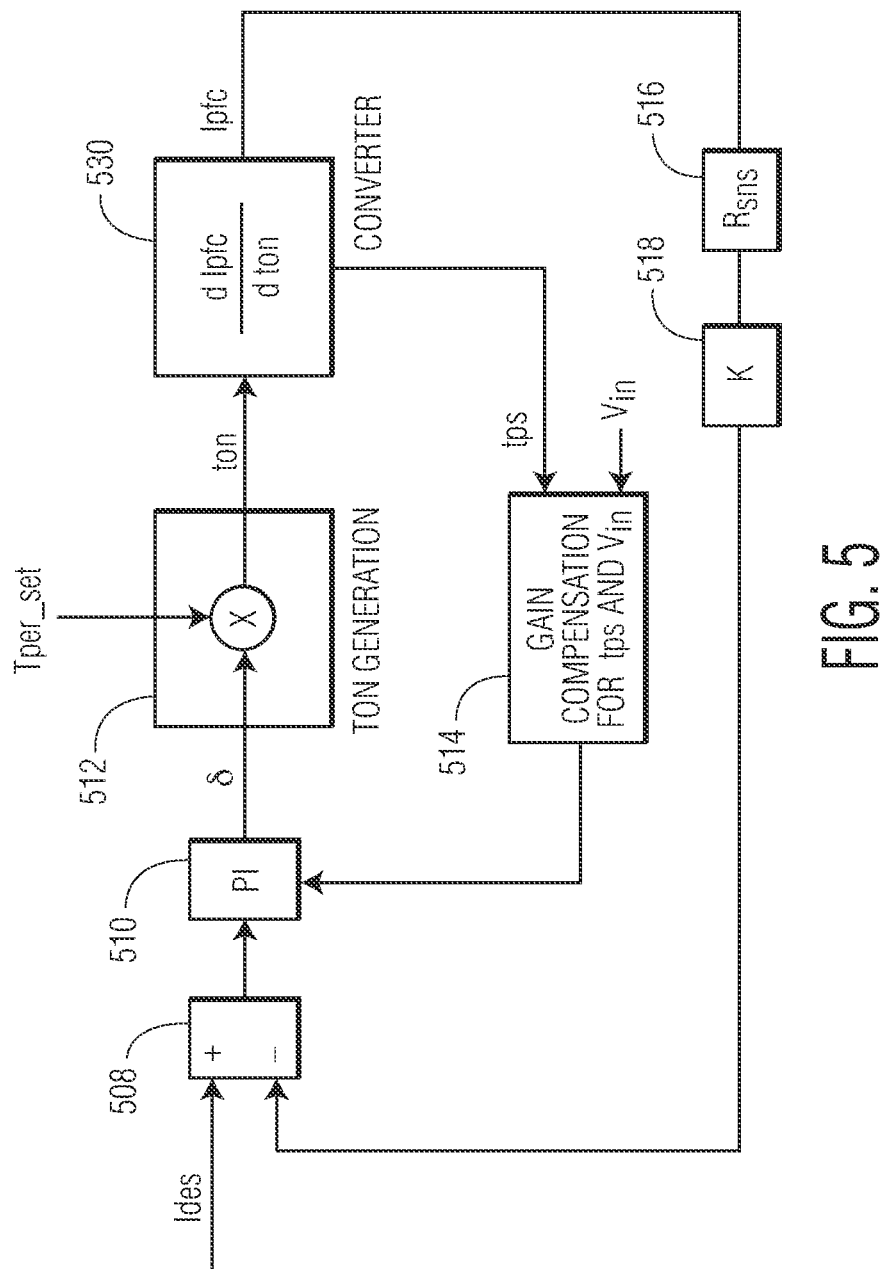
FIG. 5 illustrates the current control loop from the PFC of FIG. 1.

FIG. 5 illustrates the current control loop from the PFC of FIG. 1. The current control loop includes subtractor 508, PI 510, signal switch generator 512, the current of the PFC is sensed via a sense resistor Rsns 516 and multiplied by the gain amplifier 518. The loop gain is compensated 514 based upon $t_{ps}$ and/or $V_{in}$. The boost converter 530 function is the same as the boost converter 130 from FIG. 1 with Ipfc as the inductor current The PFC sets a certain period time $t_{per\_set}$ and this time is also used for generating the on time $t_{on}$. But in BCM or DCM the real period time $t_{per\_actual}$ may differ from the set period time which results in a loop gain drop, because in equation (1) the $t_{ps}$ and $V_{in}$ are already compensated for in the gain compensation 514 of a CCM and DCM system that uses average mode control (by changing the gain direct or via shifting the zero frequency) described in a related patent application, U.S. patent application Ser. No. 17/198,884, filed, Mar. 11, 2021 entitled "COMPENSATING GAIN LOSS FOR A POWER CONVERTER IN DCM AND CCM" (the '884 application), which is hereby incorporated by reference for all purposes as if included herein.

From equation (1) and (2) is may be seen that when the $t_{sec}$ becomes larger that the pole frequency of the converter becomes low. This is not good for the phase margin of the loop.

An embodiment of a current control loop that compensates for variations in the frequency of the switching signal or period of that signal $T_{per}$ will now be described. The embodiment of the current control loop will add a frequency compensation such that gain is compensated in situations where the real period time $t_{per\_actual}$ is not exactly the desired period time $t_{per\_set}$ when operating in BCM when CCM is not allowed or when valley switching is added to the system. The value $t_{per\_actual}$ may be measured from the previous cycle of the boost converter. When the $t_{per\_actual}$ rises above a pre-set period, the loop gain may be reduced to keep the phase margin sufficient. When $t_{per\_set}$ rises above a pre-set period the loop gain will be reduced to keep the phase margin sufficient.

Figure 6:
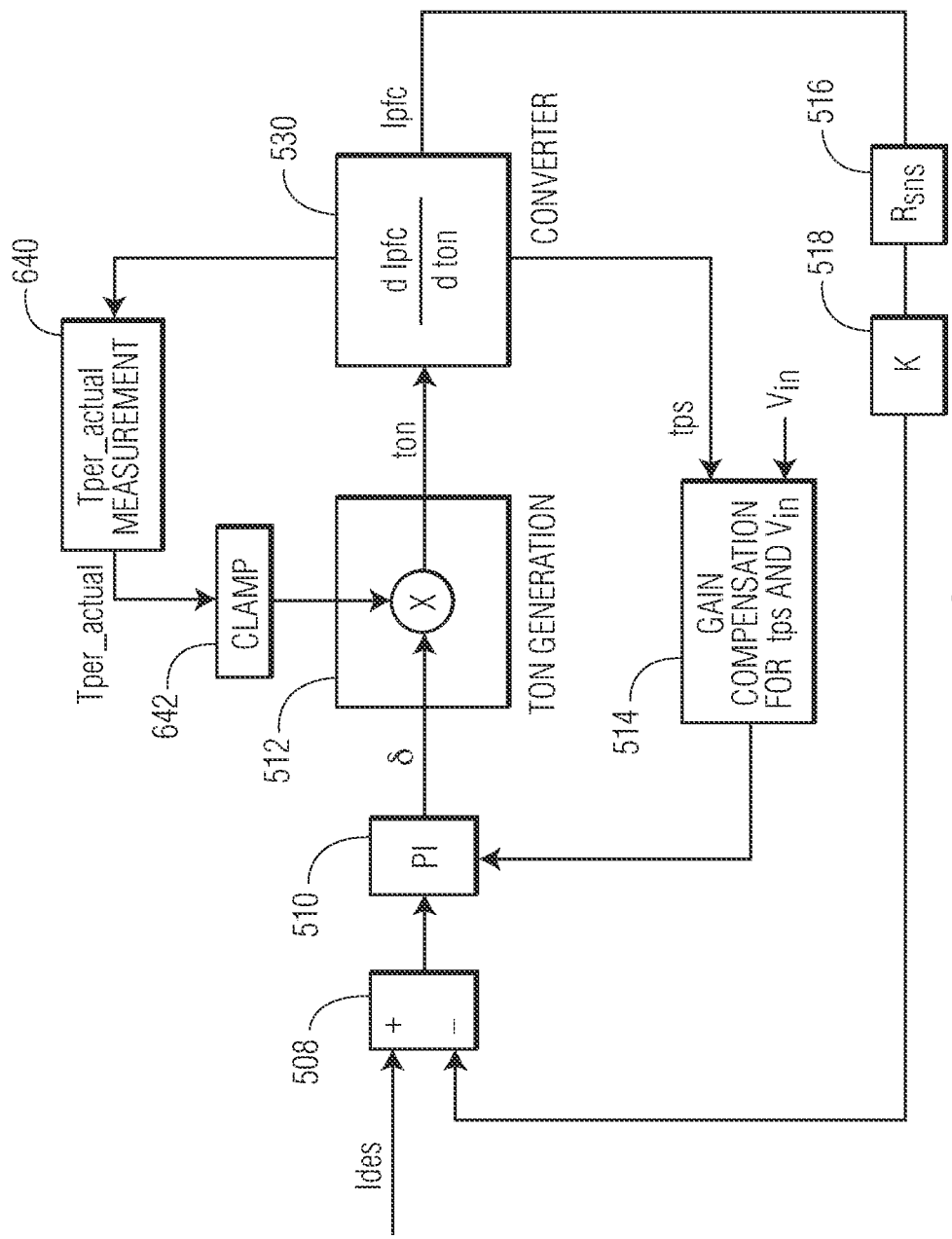
FIG. 6 illustrates an embodiment of current loop control that compensates for variations in the frequency of the switching signal or period of that signal ($t_{per\_actual}$)

FIG. 6 illustrates an embodiment of current loop control that compensates for variations in the frequency of the switching signal or period of that the switching signal $T_{per\_actual}$. The loop bandwidth is a function of (when in equation (1) tps and Vin are already compensated as described in the '884 application):

$$\frac{t_{per\_set}}{t_{per\_actual}} \quad (3)$$

Therefore as $t_{per\_actual}$ increases versus $t_{per\_set}$, the gain decreases. Accordingly, the current control loop of FIG. 6 adds elements to compensate for the variation of $t_{per\_actual}$. A measurement circuit 640 measures the value $t_{per\_actual}$. The measured $t_{per\_actual}$ value may then be clamped. For example $t_{per\_actual}$ may be clamped to 20 us (corresponding to a frequency of 50 kHz), but any value may be used. The clamped $t_{per\_actual}$ value is then used by the switch signal generator 512 to generate the switching signal used to drive the boost converter 530. As a result, the loop gain is compensated when $t_{per\_actual}$ is higher (i.e., the frequency is lower). When $t_{per\_actual}$ is higher than the clamp value, the loop gain and loop bandwidth is reduced such that phase margin is still fine. As the $t_{per\_actual}$ value increases, the loop bandwidth and loop gain decreases. The $t_{per\_actual}$ value may be measured by determining the time between 2 gate turn-ons. This value is then updated every cycle.

In theory the embodiment of FIG. 6 should solve the issues of varying $t_{per\_actual}$, but in practice, the result is not as good as needed for various applications, because of the variations in the feedback from the converter to the input. For example, as discussed above with respect FIGS. 3 and 4, there are multiple valleys that may be used to use to switch to drive the switching signal. In one cycle, Valley 2 may be used to switch and the next cycle valley 3 is used. This creates a jump in the value of $t_{per\_actual}$. This jump in $t_{per\_actual}$ results directly in a jump in $t_{on}$ which can result that during the next cycle Valley 2 may be used again. This valley hopping can result in audible noise. Adding some filtering can solve the issue.

Figure 7:
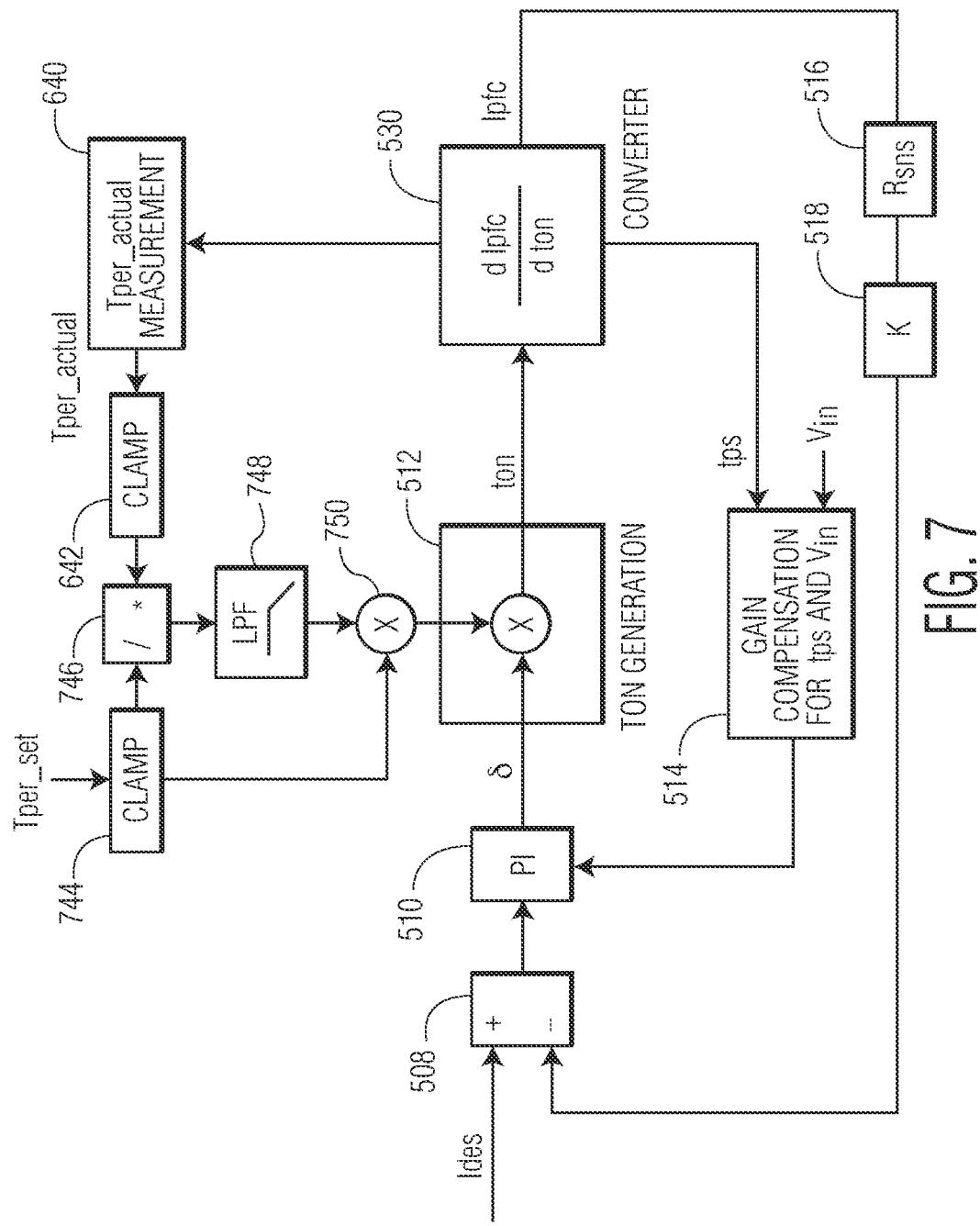
FIG. 7 illustrates a first embodiment of a current loop control using filtering of the measured $t_{per\_actual}$ value.

FIG. 7 illustrates a first embodiment of a current loop control using filtering of the measured $t_{per\_actual}$ value. As before in FIG. 6, the measurement circuit 640 measures $t_{per\_actual}$, and the clamp circuit 642 clamps the measured $t_{per\_actual}$. A second clamp circuit 744 clamps the value $t_{per\_set}$. The second clamp circuit 744 uses the same clamp value as the clamp circuit 642. A divider circuit 746 divides the clamped measured $t_{per\_actual}$ by the clamped $t_{per\_set}$. The output of the divider circuit 746 is input into a low pass filter 748. The low pass filter 748 will smooth out variations in the measured $t_{per\_actual}$ value to reduce the effects of jumps in $t_{per\_actual}$. A multiplier 750 then multiplies the output of the low pass filter 748 by the clamped $T_{per\_set}$ value. The output of the multiplier 750 is then used by the switch signal generator 512 to generate the switching signal.

Another embodiment may include simply filtering the clamped value of $t_{per\_actual}$ of FIG. 6.

Figure 8:
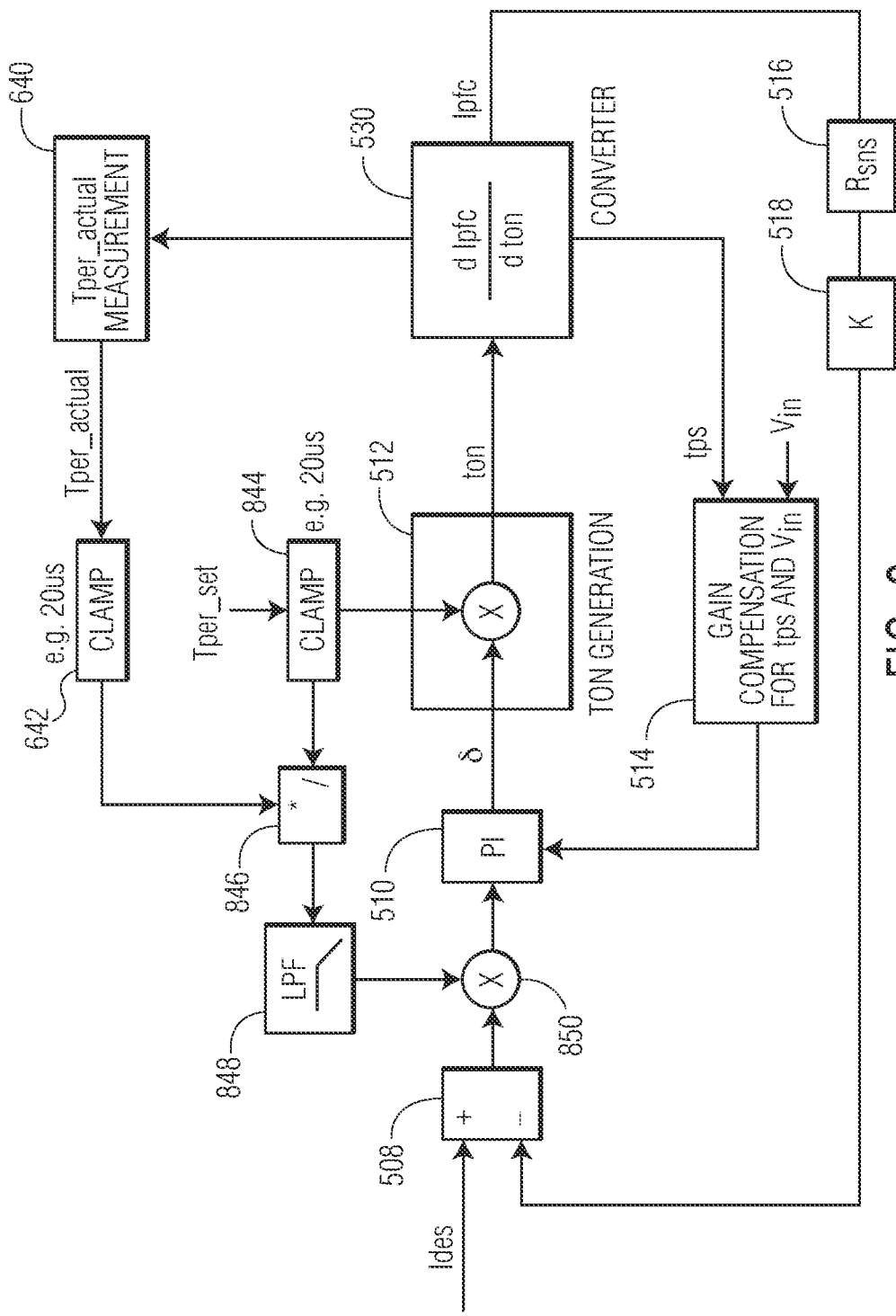
FIG. 8 illustrates a second embodiment of a current loop control using filtering of the measured $t_{per\_actual}$ value.

FIG. 8 illustrates a second embodiment of a current loop control using filtering of the measured $t_{per\_actual}$ value. As before in FIG. 6, the measurement circuit 640 measures $t_{per\_actual}$, and the clamp circuit 642 clamps the measured $t_{per\_actual}$. A second clamp circuit 844 clamps the value $t_{per\_set}$. The second clamp circuit 844 uses the same clamp value as the clamp circuit 642. A divider circuit 846 divides the clamped measured $t_{per\_actual}$ by the clamped $t_{per\_set}$. The output of the divider circuit 846 is input into a low pass filter 848. The low pass filter 848 will smooth out variations in the measured $t_{per\_actual}$ value to reduce the effects of jumps in $t_{per\_actual}$. A multiplier 850 then multiplies the output of the low pass filter 848 with the output of subtractor 508. The output of the multiplier 850 is then input into the PI 510. Further, the clamped $T_{per\_set}$ value is input into the signal switch generator 512. This embodiment results in the switching signal being scaled according to the actual period of the switching signal or $t_{per\_actual}$. The approach of FIG. 8 allows variations in the value of $t_{per\_actual}$ to be further smoothed. The compensation is filtered and the compensation is done be before the PI. This means that compensation is not directly done at the output of the integrator of the controller. This means that the effect of the compensation is limited, while the gain is corrected to the right value.

The various embodiments disclosed herein use a measured value of the actual period of the switching signal to control the switch signal generator when the boost converted is being operated in BCM or DCM with valley switching. This allows for overcoming variations in the actual switching period versus a desired switching period and the resulting gain loss in the current loop controller.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A current loop controller configured to control a boost converter, comprising:
    an amplifier configured to scale a measured current;
    a subtractor configured to subtract the scaled measured current from a desired current and to output an error signal;
    a controller including an integral part and a proportional part configured to produce a control signal based upon the error signal;
    a measuring circuit configured to measure an actual switching period of the boost converter; and
    a switching signal generator configured to produce a switching signal based upon the control signal and the measured actual switching period, wherein the switching signal controls the boost converter.

2. The current loop controller of claim 1, further comprising a first clamp circuit configured to clamp the measured actual switching period.

3. The current loop controller of claim 1, further comprising a low pass filter configured to filter the measured actual switch period.

4. The current loop controller of claim 3, further comprising:
    a divider configured to divide the measured actual switching period by a set time period;
    a multiplier configured to multiply the set time period and an output of the low pass filter,
    wherein the low pass filter filters an output of the divider, and
    wherein the output of the multiplier is input into the switching signal generator.

5. The current loop controller of claim 4, further comprising:
    a first clamp circuit configured to clamp the measured actual switching period; and
    a second clamp circuit configured to clamp the set time period.

6. The current loop controller of claim 3, further comprising:
    a divider configured to divide the measured actual switching period by a set time period;
    a multiplier configured to multiply an output of the low pass filter with the error signal, wherein the output of the multiplier is input into the controller including the integral part and the proportional part,
    wherein the low pass filter filters an output of the divider, and
    wherein the switching signal generator is further configured to generate the switching signal based upon the set time period.

7. The current loop controller of claim 6, further comprising:
    a first clamp circuit configured to clamp the measured actual switching period; and
    a second clamp circuit configured to clamp the set time period.

8. A current loop controller configured to control a boost converter, comprising:
    an amplifier configured to scale a measured current;
    a subtractor configured to subtract the scaled measured current from a desired current and to output an error signal;
    a controller including an integral part and a proportional part configured to produce a control signal based upon the error signal;
    a measuring circuit configured to measure an actual switching period of the boost converter;
    a first clamp circuit configured to clamp the measured actual switching period; and
    a second clamp circuit configured to clamp a set time period to a clamp value, wherein the first clamp circuit has a same clamp value;
    a divider configured to divide the clamped measured actual switching period by the clamped set time period;
    a low pass filter configured to filter an output of the divider;
    a multiplier configured to multiply an output of the low pass filter with the error signal, wherein an output of the multiplier is input into the controller including the integral part and the proportional part; and
    a switching signal generator configured to produce a switching signal based upon the control signal and the clamped set time period, wherein the switching signal controls the boost converter.

9. A method for controlling a current loop controller configured to control a boost converter, comprising:
    scaling a measured current;
    subtracting the scaled measured current from a desired current and outputting an error signal;
    producing a control signal based upon the error signal using a controller including an integral part and a proportional part;
    measuring an actual switching period of the boost converter;
    low pass filtering a value based upon the measured actual switching period to produce a filtered value; and
    producing a switching signal based upon the control signal and the value, wherein the switching signal controls the boost converter.

10. The method of claim 9, further comprising clamping the measured actual switching period based upon a clamping value.

11. The method of claim 9, further comprising:
dividing the measured actual switching period by a set time period to produce a divided value; and
multiplying the set time period and the filtered value to produce a multiplied value,
wherein the low pass filtering filters the divided value, and
wherein producing the switching signal is further based upon the multiplied value.

12. The method of claim 11, further comprising: clamping the set time period based upon the clamping value.

13. The method of claim 9, further comprising:
dividing the measured actual switching period by a set time period to produce a divided value; and
multiplying the filtered value with the error signal producing a multiplied value, wherein producing the control signal is further based upon the multiplied value,
wherein the low pass filtering filters the divided value.

14. The method of claim 13, further comprising: clamping the set time period based upon the clamping value.

\* \* \* \* \*